United States Patent [19]

Evenson et al.

[11] 4,310,970
[45] Jan. 19, 1982

[54] VEGETATION CUTTING APPARATUS

[76] Inventors: Dale D. Evenson, 60 Buckskin La., Rolling Hills Est., Calif. 90274; Virgil H. Stair, 15411 Cohasset St., Van Nuys, Calif. 91406

[21] Appl. No.: 57,851

[22] Filed: Jul. 13, 1979

Related U.S. Application Data

[63] Continuation of Ser. No. 742,963, Nov. 17, 1976, Pat. No. 4,169,311.

[51] Int. Cl.³ .......................................... A01D 50/00
[52] U.S. Cl. ....................................... 30/276; 56/12.7
[58] Field of Search ..................... 30/276, 347; 56/12.7

[56] References Cited

U.S. PATENT DOCUMENTS

| | | | |
|---|---|---|---|
| 2,533,619 | 12/1950 | Pokras | 51/335 |
| 2,621,494 | 12/1952 | Cross | 192/71 |
| 2,709,323 | 5/1955 | Swan | 51/335 |
| 2,771,721 | 11/1956 | Reiman | 51/335 |
| 2,854,798 | 10/1958 | De Haven | 51/335 |
| 3,664,102 | 5/1972 | Reber | 56/295 |
| 3,708,967 | 1/1973 | Geist et al. | 56/12.7 |
| 3,826,068 | 7/1974 | Ballas et al. | 56/12.7 |
| 3,859,776 | 1/1975 | Ballas et al. | 56/12.7 |
| 3,928,911 | 12/1975 | Pittinger | 56/12.7 |
| 4,134,204 | 1/1979 | Perdue | 30/276 |

FOREIGN PATENT DOCUMENTS

| | | | |
|---|---|---|---|
| 1502459 | 4/1970 | Fed. Rep. of Germany | 51/359 |
| 1281450 | 12/1961 | France | 30/276 |

*Primary Examiner*—Jimmy C. Peters
*Attorney, Agent, or Firm*—Nilsson, Robbins, Dalgarn, Berliner, Carson & Wurst

[57] ABSTRACT

An apparatus for cutting vegetation wherein at least one line member protrudes exteriorly of the sidewall of a housing which is rotatable about a rotating axis. The line member is a tape and is wound upon a spool, which is mounted within the housing so that the width, which is greater than the thickness, is perpendicular to the plane of the spool. The flat tape line member is formed of a flexible band of material which extends exteriorly of the housing in a trailing position. Cutting apparatus are incorporated to effect cut off of the line member during rotation of the housing and dispensing apparatus are provided to extend additional line member a controlled increment of length during rotation of the housing. The cutting apparatus is provided to cut off the excess end of the worn or broken line member. A clamping device clamps the line member to the housing when it is not rotating to prevent retraction of the line member into the housing.

11 Claims, 7 Drawing Figures

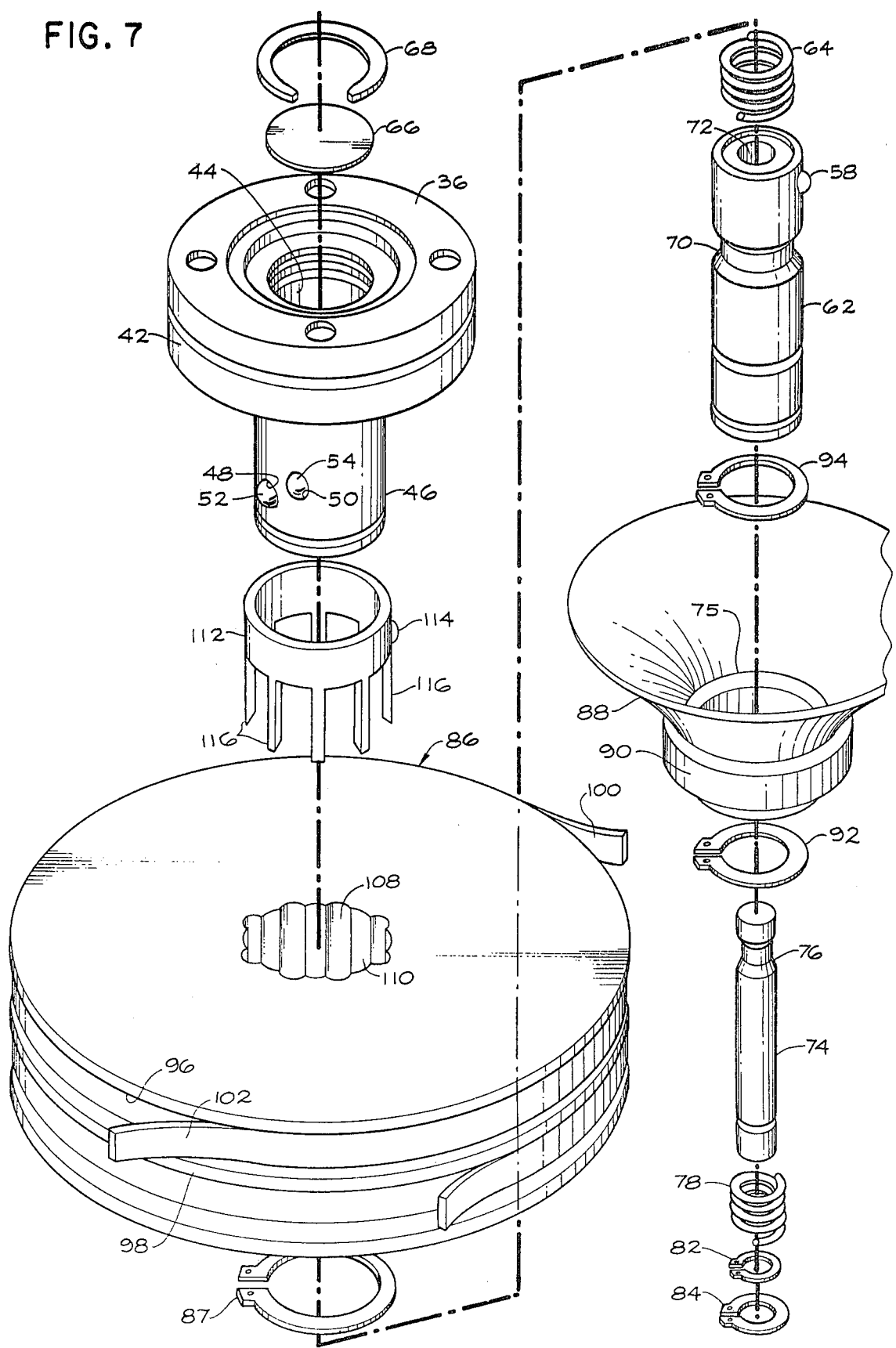

VEGETATION CUTTING APPARATUS

This is a continuation of application Ser. No. 742,963, filed Nov. 17, 1976, now U.S. Pat. No. 4,169,311.

BACKGROUND OF THE INVENTION

One field for this invention is directed to a weed and grass cutting machine which effects the cutting action by means of a length of a flexible band or bands, and more particularly to a portable power driven device which is capable of being readily moved by a person to achieve the cutting action.

In the past, there have been devices which employ a flexible line to achieve cutting weeds and grasses. These flexible line devices have been known to take the form of a power source attached to a shaft which, in turn, is connected to a whirling or rotating line holding head or housing. Within the head or housing is at least one flexible cord that extends exteriorly of the housing. The head or housing is rotated at a speed sufficient to create line rigidity. The whirling cord is to be employed to cut grass, weeds, and edge lawns. If the cord breaks, an additional length of cord is unwound. Besides the advantage of such devices being useable in relatively inaccessible areas, such devices also have the advantage that if the cord comes into contact with the operator's leg, hand or arm, the whirling cord would, at most, cause only a small welt upon the operator's skin. Therefore, by using such devices, there is a significantly greater degree of safety than was previously possible with rigid steel blade types of cutting devices.

One disadvantage of the prior art type of cord cutting devices is that the cord has been known to be readily breakable. Once a cord was broken, it was necessary to stop the device, extract an additional length of cord and cut the cords to equal length to retain satisfactory dynamic balance prior to operating the device. It has not been uncommon to have many cords break in a short time under heavy cutting conditions. This means that there has been a significant amount of "down" time which is most time consuming. This stop-start operation increases power source wear and energy usage.

There is a definite need for a line cutting apparatus in which the line member is of a substantially superior strength to the line members incorporated in prior line cutting apparatuses. In the event the line member does break, a cutting device may be automatically activated to sever all line members and then appropriate line extending means provided to extend new portions of line members with each line member being of equal length. This extending of the line member and the cutting of the old line members is to be accomplished quickly and easily and in a matter of seconds without power shutdown. There is a further need for quick and easy replacement of the spool incorporated within the device upon which the line members are wound preferably without the use of hand tools.

SUMMARY OF THE INVENTION

The structure of this invention is directed to the construction of the rotating or whirling head which is to be attached to a drive shaft which is rotatably driven. The rotating or whirling head takes the form of a housing within which is mounted a flexible line assembly mounted on a spool. The spool assembly has one or more line storage sections and within each spool section is would one or more lengths of flexible line member. Each of the line members extend through an opening in the housing. The spool assembly may be quickly and easily removed and replaced within the housing without the need of hand tools.

A cutting device is mounted in the path of the line to cut the flexible line member. There is a separate cutter for each line member and the cutters are interconnected together through a ring and upon the ring contacting a stationary surface during rotation of the device, the ring member causes the cutters to be moved to cut the line members.

Also there is a line member clamping device which, when the head is below operational speed, the clamping device automatically binds each line member to the housing to thereby prevent retraction of the line member within the housing. When the rotation of the housing increases to operational speed, each clamping member automatically releases its respective line member.

The line member is constructed of a specially formulated high strength plastic material with the preferable type of material being an ultra-high molecular weight polyolefin. The cross-sectional configuration of the line member is to be such that the line member is greater in width so that the line members will not be capable of significantly bending toward the ground during use. This prevents a whipping action (that is common to round cross-sectional line) toward and away from the ground which is capable of causing "scalp" spots within a lawn area.

The device of this invention further includes dispensing means which includes an indexing sleeve which is capable of being activated while in motion by external activating means. Upon the dispensing means being activated, the indexing sleeve permits the assembly to be extended a controlled amount with respect to the housing.

Thus, if one or more of the line members breaks or wears, the dispensing means causes segments of new line members to be extended from the housing with each segment being of the same length.

One of the primary advantages of this invention is that the line member employed is significantly stronger than heretofore used and it is actually very difficult to break during operation.

A further advantage of this invention is that if the line member does break or wear, the operator may dispense in a few seconds an equal length of line members to continue the cutting action, without stopping the operation of the device.

A further advantage of this invention is that each of the line members are stronger in width to thereby control up and down action of the line member which, in the past, has caused poor line control.

A still further advantage of this invention is that because of the wider cutting face the line member is significantly less inclined to wrap or "bullwhip" around any fixed object which, in the past, has caused breaking of the line member.

A still further advantage of this invention is that the line members can also be replaced in just a matter of seconds without tools.

A still further advantage of this invention is that each line member assumes a trailing position with respect to the rotational movement of the housing and this trailing position further makes it less likely that the line member will be broken. Outside the exit point, the line curves to a radial position thus forming its own shock absorber with this curve.

BRIEF DESCRIPTION OF THE DRAWINGS

FIG. 7 is an exploded isometric view of the internal components employed within the head or housing of this invention.

DESCRIPTION OF THE PREFERRED EMBODIMENT

Figure 1:
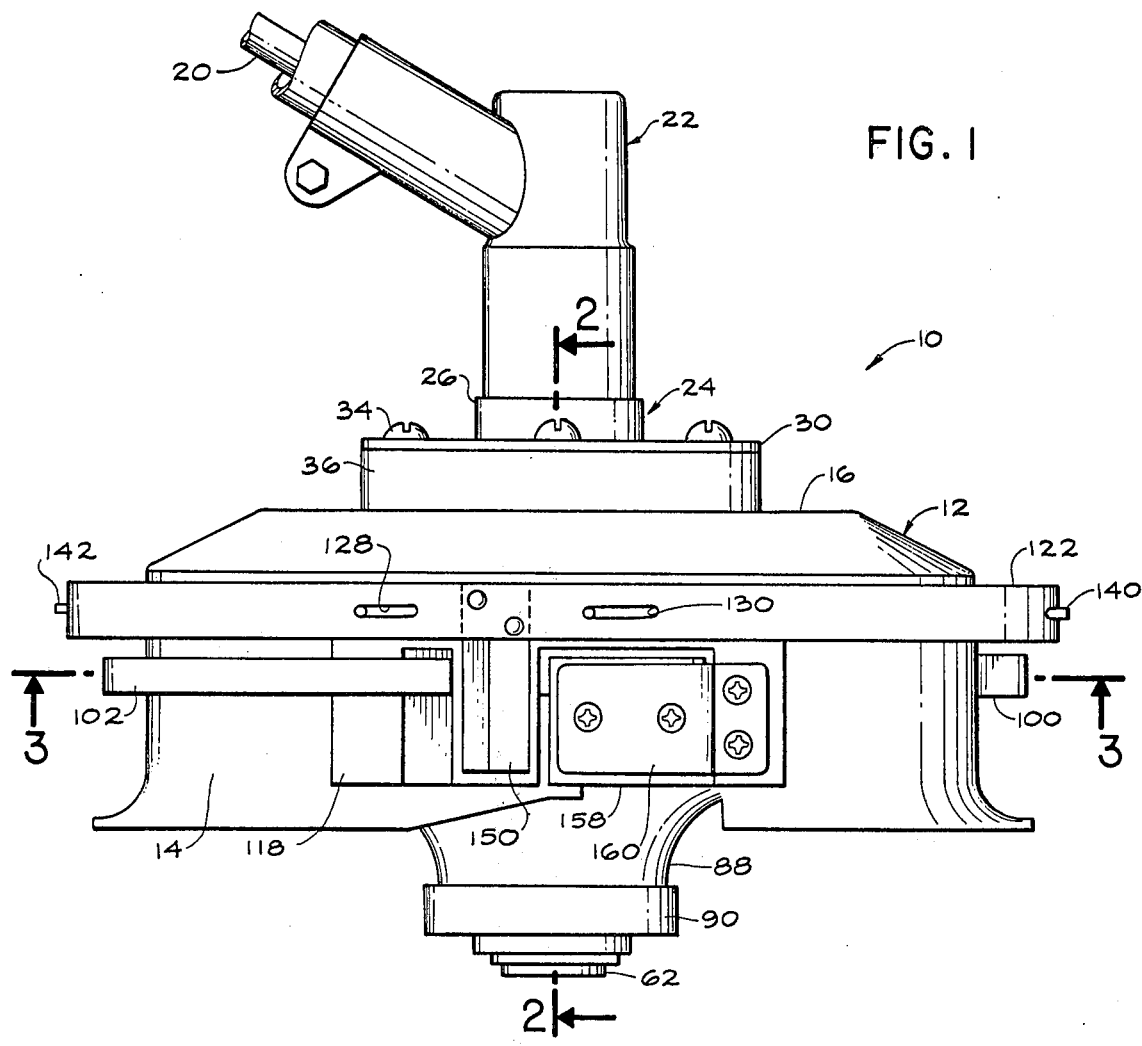
FIG. 1 is an elevational side view of the whirling head or housing incorporated within a portable type of line cutting apparatus.
Figure 5:
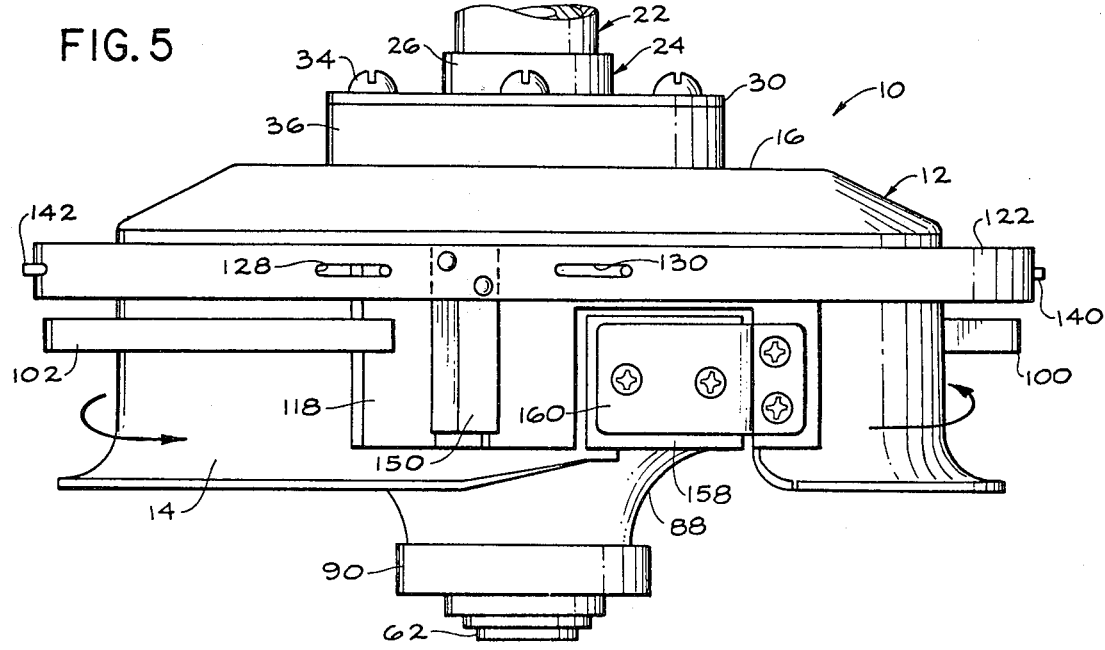
FIG. 5 is a view similar to FIG. 1 but with the cutting means in the activated position.
Figure 3:
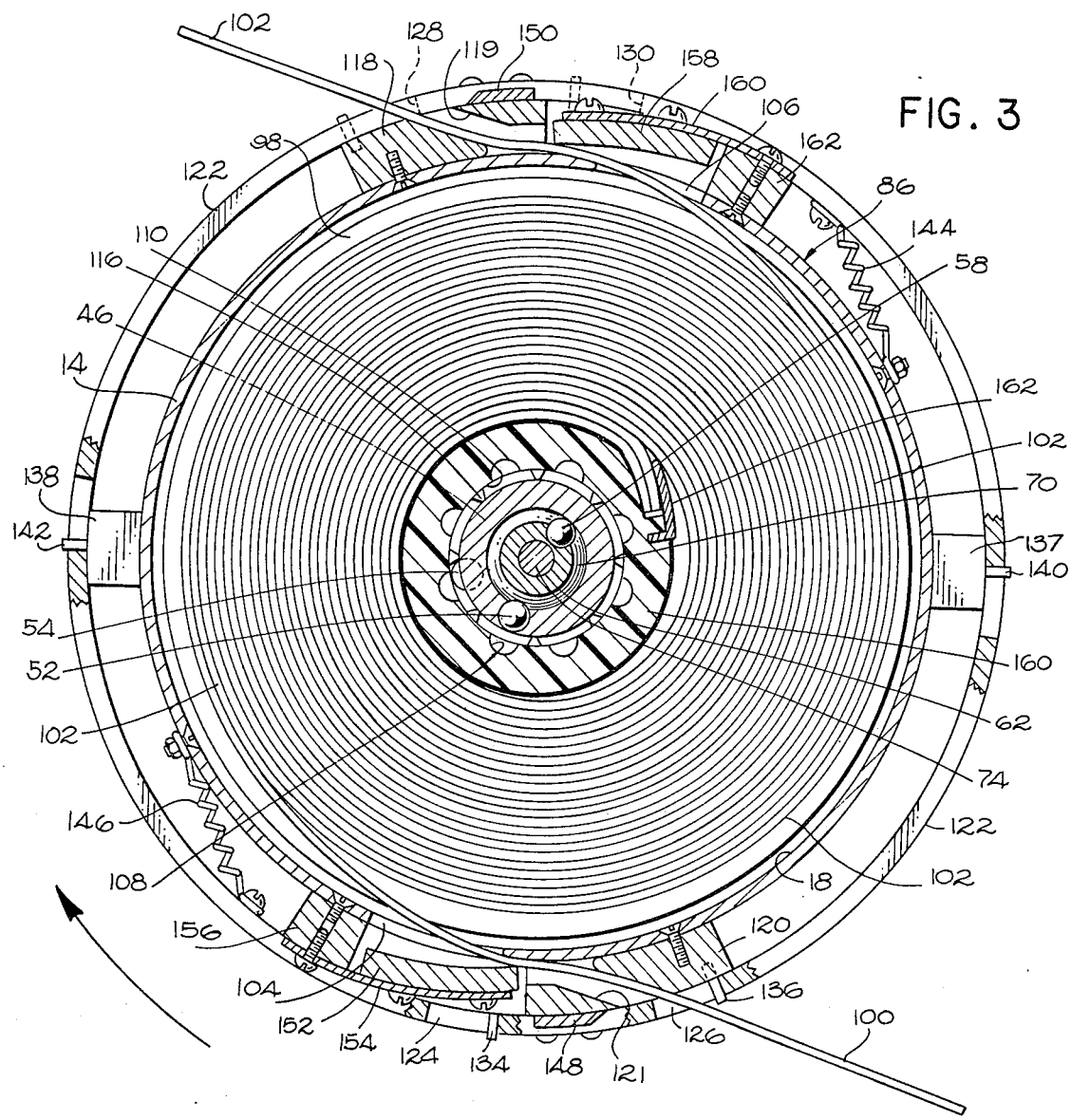
FIG. 3 is a cross-sectional bottom view taken along line 3—3 of FIG. 1.
Figure 6:
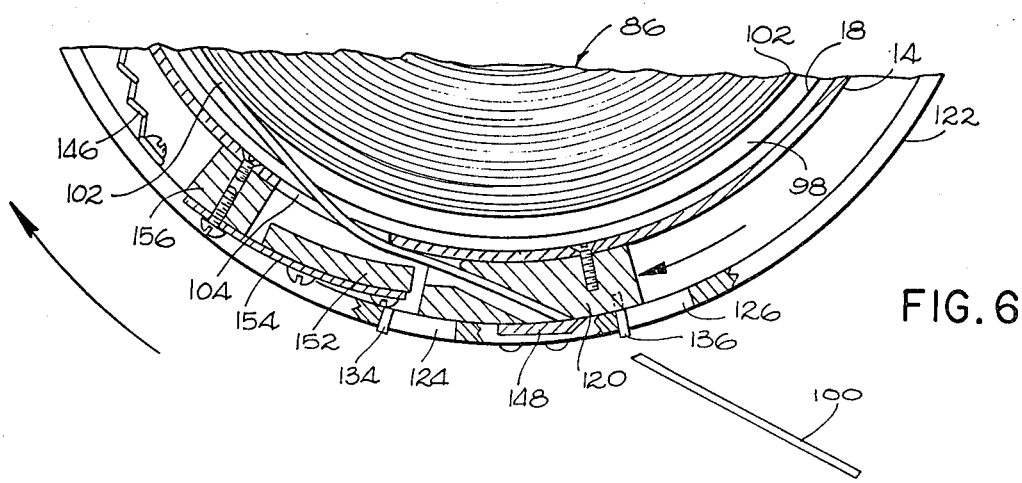
FIG. 6 is a partial cross-sectional bottom view depicting the cutting action of a line member.

In FIG. 1, the apparatus 10 of the present invention includes a rotatable housing 12, with line members 100 and 102 extending exteriorly from the housing and adapted, upon rotation of the housing to effect cutting of vegetation. Cutting means are provided on a ring 122 with knife blades 148 and 150, attached, to cut off worn or broken line members 100 and 102 (FIGS. 3 and 6). If the operator touches ring 122 to the ground, causing a reduction in the rotational speed of the ring 122, cutting blades 148 and 150 cut off lines 100 and 102 equally.

In FIG. 7, a dispensing means is shown including a program ring 112, having a key 114, which dispensng means can permit an unwinding rotation of spool 86 on which the line members 100 and 102 are mounted, to extend both line members an equal length. In FIG. 6 is shown clamping means (for line 100) including a leaf spring 154 and a clutch shoe 152 secured thereto which prevents retraction of the line member. In FIGS. 3 and 6, the line members 100 and 102 extend exteriorly from the housing 12 in a trailing position, at an angle with respect to a radial line of the housing 12 to reduce sharp bends in the line members and reduce line breakage at the exit point. The line members 100 and 102 have a width dimension, which is, perpendicular to the plane of rotation, and which is greater than the thickness dimension to provide greater rigidity, ease of unwinding, and better "nesting" of line in the container without snags.

In FIG. 1 the apparatus 10 of this invention takes the form of an exterior housing 12 which has an annular side wall 14, closed at one end thereof by an end wall 16. A drive shaft 20 is to be rotatably driven by a motor (not shown). The drive shaft 20 operates through unit 22 to rotate a mandril head 24. The mandril head 24 includes a member 26 which is splined to the rotating shaft which is located within the unit 22. This keying is not shown.

Figure 2:
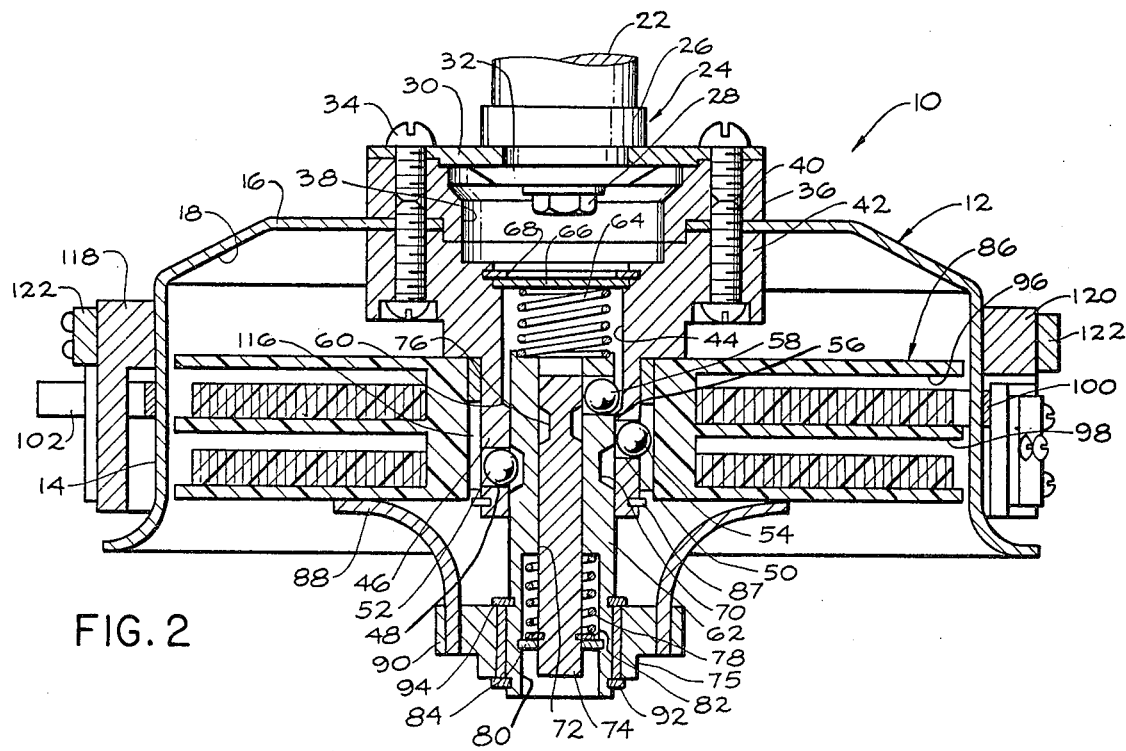
FIG. 2 is a cross-sectional view taken along line 2—2 of FIG. 1.
Figure 4:
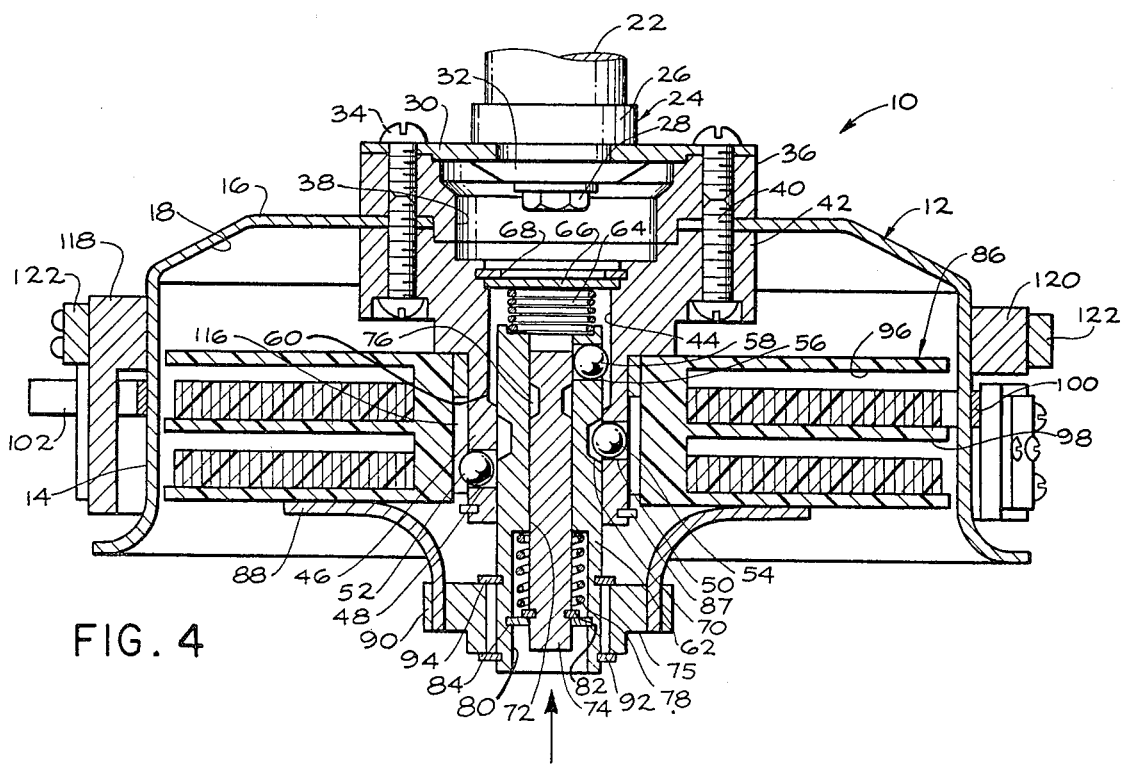
FIG. 4 is a view similar to FIG. 2 but with the indexing means in the activated position.

In FIGS. 2 and 4, a bolt 28, is threadably secured also with the drive shaft located within the unit 22 and about the bolt 28 are located an adaptor plate 30 and a washer assembly 32. Upon tightening of the bolt 28, the adaptor plate 30 is tightly secured and centered between the washer assembly 32 and the rotating member 26. The adaptor plate 30 is designed to allow versatile attachment for many different kinds of driving mechanisms without major redesign. Therefore, upon rotation of the drive shaft 20, the entire mandril head 24 is rotated which includes the bolt 28, the adaptor plate 30 and the washer assembly 32, as well as the rotating member 26, thus rotating the complete head assembly.

In FIG. 2, an upper hub assembly 36 is attached by a plurality of bolts 34 to the adaptor plate 30. The upper hub assembly 36 includes an internal opening 38 which is to accommodate the bolt 28 and the washer assembly 32. Opening 38 is sufficiently large enough to accommodate known drive shaft systems.

Fastened to the upper hub assembly 36 by means of a plurality of bolts 40, is a lower hub assembly 42. The lower hub assembly 42 also includes an internal opening 44. Fixedly secured and centered between the upper hub assembly 36 and the lower hub assembly 42 is end plate 16 of the housing 12.

In FIG. 2, the lower hub assembly 42 has integrally secured therewith a cylindrical tubular section 46. Within the section 46 are located a pair of openings 48 and 50. The openings 48 and 50 are in fact, located fairly close to one another, however, this is not mandatory but there is a necessary spacing arrangement between the openings 48 and 50 relative to posts 116 which will become apparent further on in the specification. Within opening 48 is located a steel ball 52. Openings 48 and 50 are staked or restricted at their openings to retain the balls.

For illustrative purposes only, the steel balls 52 and 54 are located at what appears to be diametrically opposite each other within FIGS. 2 and 4. However, in actual practice, these balls 52 and 54 cannot be located exactly diametrically opposite each other but they can be located somewhat close to diametrically opposite each other. However, the balls 52 and 54 in the actual embodiment are located as in FIG. 7 of the drawings, "straddling" one post 116 of programming ring 112.

Slidably mounted within tubular section 46 is sleeve 62. At the top end of the sleeve 62 there is located a coil spring 64. The free end of the spring 64 contacts a plate 66 which is fixedly positioned by retainer ring 68 within the lower hub assembly 42. When in the rest position, the spring 64 forces the sleeve 62 in an outward direction with respect to the tubular section 46. This position is shown in FIG. 2 of the drawings. In this position, the ball 52 is partially positioned within the annular recess 70 formed within the outer surface of the sleeve 62. The ball 54 is in abutting contact with the outer surface of the sleeve 62, thus locking tubular section 46, programming ring 112 and spool 86 together.

Located interiorly of the sleeve 62 is a longitudinal opening 72. Within the opening 72 is located a plunger 74. The plunger 74 within its outer surface thereof includes an annular recess 76. A ball 58 is mounted within an opening 56 formed within the sleeve 62. The ball 58 is capable of cooperating with the recess 76. However, when the ball 58 is not cooperating with the recess 76, the ball is in contact with the shoulder 60 formed within the opening 44. In the normal at rest position, the plunger 74 is spring loaded in an outward position by means of spring 78 which is located within cavity 80 formed within the sleeve 62. The inner end of the spring 78 rests against a shoulder of the inner end of the cavity 80 with the outer end of the spring 78 resting against a washer 82 which is fixedly mounted upon the plunger 74. The outward movement of the plunger 74 with respect to the sleeve 62 is prevented by means of retaining ring 84. With the plunger 74 in its normal at rest position, spring 78 is extended with the washer 82 resting against retaining ring 84. In this position, the recess 76 does not connect with the ball 58 and the ball 58 rests against a portion of the outside surface of the plunger 74 which causes the ball 58 to extend slightly and come against shoulder 60 in opening 44. This prevents withdrawal movement or outward movement of the sleeve 62 from the tubular section 46 and attaching parts. This means that the spool assembly in the form of spool 86 is held in position within the chamber 18. The spool 86 is held in this position by means of cuff 88. The cuff 88 is secured by ring 90 and they rotate together. The rotating member 75 rotates on sleeve 62. The sleeve 62 provides a bearing between snap rings 92 and 94. The cuff 88 is formed of a flexible material such as rubber or plastic. The spring action of the cuff 88 holds the spool 86 in position. Pressing of plunger 74 allows replacement of the reel 86.

The spool 86 defines a first spool section 96 and a second spool section 98. Within each of the spool sections 96 and 98 is wound one or more lengths of line, with line members 100 and 102 located within spool section 96 and spare line in section 98. As the line members 100 and 102 are depleted the plunger 74 is pressed removing the sleeve 62 and the cuff 88 from the unit permitting removal of the spool 86 which may be turned over or replaced.

In FIG. 6, the line members 100 and 102 extend exteriorly from the side wall 14 of the housing 12 180° apart from each other with the free end of the line member 100 conducted through opening 104 and the free end of the line member 102 conducted through opening 106. The line members 100 and 102 extend exteriorly from the housing 12 at an angle with respect to a radial of the housing as shown in FIGS. 3 and 6. This type of extension of the lines 100 and 102 allows the lines to come out of the housing without sharp bends to reduce breakage of the lines. It also allows for heat removal without a very thick side wall in the housing for a heat sink.

If, during use, one or more of the line members break, it is desirable to extend new and equal portions of line members exteriorly of the side wall 14. To achieve this extension of the line members, a dispensing means is provided which will now be described.

In FIG. 7, the hub opening within the hub section of the spool 86 is divided into a number of keyways 108. Each adjacent pair of recesses 108 are separated by a raised section 110 on which posts 116 rest. A program ring 112 is provided which has a key 114 formed thereon which can enter any one of keyways 108. Also extending from the lower edge of the ring 112 are a number of spaced legs 116. There are eight in number of legs 116 but any number could be used depending on the amount of line desired to dispense. In actual practice, it is envisioned that the ring 112 including the legs 116 will be fabricated integrally within the hub section of the spool 86.

The program ring 112 is to be inserted within the opening within the hub of the spool 86 and the key 114 aligns with any one of the keyways 108 the program ring is held in place on tubular section 46 by retaining ring 87. With the program ring 112 so installed, each leg 116 is located upon a raised section 110. Each of the legs 116 are pointed at their innermost end and since they are adapted to come into contact with balls 52 and 54, the pointing of the legs is to avoid any possibility of the balls 52 and 54 "hanging up" directly upon a leg 116.

In FIG. 2, the sleeve 62 is in the downward position caused by the action of spring 64 and the spring action of the cuff 88. The ball 54 rests against a portion of the peripheral surface of the sleeve 62 which causes the ball 54 to partially extend between any two of the legs 116. The ball 52 cooperates with recess 70 which means that the ball 52 is not in the circular path of any of the legs 116.

In FIG. 4, if the end of the sleeve 62 is brought into contact with a fixed object by the machine operator the sleeve 62 is moved vertically against the action of the spring 64 and the springing of the cuff 88 to the position shown in FIG. 4 of the drawings. The cuff 88, being in contact with the spool 86, and connected to sleeve 62, is slowed down in speed relative to housing speed causing a clutching or braking action on spool 86, legs 116 and ball 54 Thus all slack is taken up and balls 52 and 54 are in a positive position for indexing (relative to legs 116). Then ball 54 retracts into the recess 70 which causes the ball 54 to be taken out of contact with one of the legs 116. At the same time, the ball 52 in recess 70 has been forced outwardly between two of legs 116 allowing ring 112 and spool 86 to rotate slightly which dispenses additional lengths of line members 100 and 102.

The striking of the sleeve 62 upon the ground or other hard surface is only for an instant and when it moves away from the ground, the sleeve 62 then moves back to its position shown in FIG. 2. When such occurs, the ball 52 becomes reassociated with recess 70 and the ball 54 becomes associated with the peripheral surface of the sleeve 62. The spool 86 then pivots with respect to the housing 12 until the next leg 116 contacts ball 54 whereupon the spool 86 is again fixed with respect to the housing 12. The net result is that, the spool 86 has rotated and will have extended the line members 100 and 102. Each time the sleeve 62 is struck, a new length of line member is caused to automatically extend from the housing 12. Although in the preferred embodiment the sleeve is shown moved upwardly to dispense additional line, it will be appreciated, from the teaching of the present invention, that the dispensing mechanism may be placed at a different part of the apparatus to enable a user to move a sleeve, shaft, pin, inclined plane or other suitable member to dispense additional line.

The line members 100 and 102 are to be constructed of a very strong material. In the past, these line members have been formed of circular cross-section and are of nylon. This type of material has been found to readily break and also, the line members have a tendency to whip relative to the ground as the device is being used. This type of action is particularly undesirable because, at times, it is desirable to cut the vegetation at a particular height. The result is that there are gouges or scalp areas formed on the vegetation which provides an unsightly appearance. Additionally, round line, under some conditions, will twist together above or below the housing forcing machine shut down.

Each of the line members 100 and 102 of this invention is constructed in the shape of a narrow flexible tape or band wherein the width of the band, which is greater than the thickness, is perpendicular to the plane of rotation of the housing 12. The result is that the band is most rigid in the width direction when rotating. Although the line member is shown having a rectangular cross section, the cross section may be any non-circular shape provided the width dimension, which is perpendicular to the plane of rotation of the spool 86, is greater than the thickness dimension.

The preferable type of material for each of the line members 100 and 102 would be an ultra-high molecular weight polyolefin thermoplastic. The properties of this material are found to be that the material has excellent abrasion resistance, high-energy impact absorption, low coefficient of friction, a very low moisture absorption and is resistant to corrosion and chemicals. In use, the line members 100 and 102 are constantly striking vegetation and also possibly fixed objects, such as rocks, brickwork, pipe, lamp poles, cement walk ways, and so forth. With this particular material, hardness actually is increased when impacted. Therefore, the material itself, when struck, has a tendency to become stronger which is most desirable in the present application.

If one of the line members 100 or 102 comes into contact with a sharp object or is repeatedly struck in the same spot against a hard object, the line member may break. This breaking of the line member prevents that line member from cutting and also creates a dynamic imbalance if the other line member is not broken. Therefore, if a line member is broken, it is desirable to cut all line members the same length prior to operation of the dispensing means which releases the line members.

In FIGS. 3 and 6 is shown an outer ring 122 which when touched to the ground at a slower than operational speed, there is a reduction of speed of the outer ring 122 with respect to the speed of the line members causing ring 122 to rotate cutting blades 148 and 150 to cut off lines 100 and 102.

Fixedly mounted to the exterior surface of the side wall 14 and adjacent to (and on the trailing side) of the opening 106 is a guide means in the form of block 118 and opposing face 119. A similar such guide block 120 and opposing face 121 is similarly located adjacent opening 104. The guide means cause the line members to extend exteriorly of the housing 12 at an angle with respect to a radial to, as indicated above, reduce sharp bends and consequent breakage.

The surfaces of the guide blocks 118 and 120 and their respective associated opposing faces 119 and 121 are formed of a suitable heat conductive material such as any suitable metal for providing a heat sink. During heavy cutting, the tape whips or vibrates and frictional heat at the exit port is removed by the metal surfaces of the guide blocks 118 and 120 and opposing faces 119 and 121.

In FIG. 3, the annular ring 122 surrounds entirely the side-wall 14. Located within the ring 122 are a series of longitudinal slots, 124, 126, 128, and 130. Each of the slots cooperate with separate pins, e.g., pins 134 and 136. Also, there are secured to the housing side wall 14, diametrically opposite each other, support blocks 137 and 138 which have secured thereto a pin 140 and 142, respectively, which, in turn, cooperate respectively with a slot formed within the ring 122 with these slots being also similar to the slots 124 126, 128 and 130. A pair of springs 144 and 146 are interconnected between the ring 122 and the sidewall 14 of the housing 12. These springs function to exert a continuous pull upon the ring 122 tending to place the ring 122 in the position shown in FIG. 3 of the drawings with the cutting blades retracted.

Guide block 120 provides support surface for the ring 122 which has a knife blade 148 mounted thereon adjacent the forward surface of the guide block 120. On the opposite side, a similar knife blade 150 is mounted upon the ring 122. With the housing 12 rotating, the operator only need to cause the ring 122 to come in contact with a fixed surface, such as the ground, piece of cement, or a wall which causes the ring 122 to be momentarily stopped. Since the housing 12 continues to rotate, the knife blade 150 is quickly moved against the line member 102 and simultaneously the knife blade 148 is moved against the line member 100. Once the ring 122 is then moved away from the fixed object, the springs 144 and 146 return the cutters 148 and 150 to retract position spaced from the line members 100 and 102, respectively. In both instances, the line members 100 and 102 are severed adjacent guide blocks 118 and 120, and both are cut off equally. Alternatively, the knife blades may be arranged to act against anvil means or one blade can cut all live members. The cutting position of the cutters is shown in FIG. 6 of the drawings.

This cutting of the line members is usually accomplished prior to operating of the dispensing means which then is operated the desired number of times in order to extend the line members the desired distance exteriorly of the housing 12.

Also located adjacent each of the openings 104 and 106 is a clamping means for each line member. When the device is at less than operating speed, it is desirable to prevent retraction of the line member to within the spool 86 in chamber 18. To prevent this from happening, a clutch shoe 152 is located adjacent the opening 104 and is secured to a leaf spring 154. The leaf spring 154 is secured to a mounting block 156 which, in turn, is fixedly secured to the side wall 14 of the housing 12. When the device is in the at rest position (shown in FIG. 3), the leaf spring 154 forces the clutch shoe 152 in an inward direction toward the side wall 14 and binds the line member 100 against the side wall 14. Once the device is at operating speed, the centrifugal force will overcome the force of the spring 154 and the clutch shoe 152 will be moved outwardly and be spaced from the line member 100. This position is shown clearly in FIG. 6 of the drawings.

A similar clutch shoe 158, secured to a leaf spring 160 which is secured to a mounting block 162 in turn fixedly secured to the side wall 14, is employed to connect with the line member 102.

The inner end of each of the line members 102 and 100 are fixed to the hub, 160 of the spool 86 by being snapped under a small leaf spring 162 which is fixedly secured to the hub 160.

Obviously minor modifications and variations are possible in the light of the above teachings. It is therefore to be understood that the invention can be practiced otherwise than as specifically described.

What is claimed is:

1. A housing and dispensing assembly for a cutting line member of a cutting apparatus, comprising:
 a housing rotatable about an axis;
 a spool mounted within said housing for winding the line member therearound and for extending the line member therefrom exteriorly of said housing to contact and cut vegetation by rapid circular movement exteriorly of said housing during rotation of said housing; and
 means connected to said housing for locking said spool against rotation of said spool relative to said housing and for unlocking said spool during rotation of said housing to permit said relative rotation and unwinding of the line member from said spool, said locking and unlocking means including a locking and unlocking controller having a bearing surface defining an annular recess therealong, said recess being substantially centered about said axis, said controller being movably mounted in said housing for causing said unlocking of said spool through a substantially upward movement of said annular recess with respect to said housing.

2. A housing and dispensing assembly for a cutting line member of a cutting apparatus, comprising:
a housing rotatable about an axis;
a spool mounted within said housing for winding the line member therearound and for extending the line member therefrom exteriorly of said housing to contact and cut vegetation by rapid circular movement exteriorly of said housing during rotation of said housing; and
means connected to said housing for locking said spool against rotation of said spool relative to said housing and for unlocking said spool during rotation of said housing to permit said relative rotation and unwinding of the line member from said spool, said locking and unlocking means including a locking and unlocking controller having a bearing surface defining an annular recess therealong, said controller being movably mounted in said housing for causing said unlocking of said spool through movement of said annular recess substantially parallel to said axis.

3. A housing and dispensing assembly as defined in claim 2 wherein said annular recess is substantially centered about said axis.

4. A housing and dispensing assembly as defined in claim 1 wherein said locking and unlocking means further includes:
a locking element mounted in said housing to unlock said spool during said rotation of said housing by movement into said recess during said rotation of said housing upon said movement of said recess substantially parallel to said axis.

5. A housing and dispensing assembly as defined in claim 2 wherein said locking and unlocking means further includes:
a locking element mounted in said housing to unlock said spool by movement into said recess during said rotation of said housing upon said movement of said recess substantially parallel to said axis.

6. A housing and dispensing assembly for a cutting line member of a cutting apparatus, comprising:
a housing rotatable about an axis;
a spool mounted within said housing for winding the line member therearound and for extending the line member therefrom exteriorly of said housing to contact and cut vegetation by rapid circular movement exteriorly of said housing during rotation of said housing; and
means connected to said housing for locking said spool against rotation of said spool relative to said housing and for unlocking said spool during rotation of said housing to permit said relative rotation and unwinding of the line member from said spool, said locking and unlocking means including,
a locking and unlocking controller having a bearing surface defining an annular recess therealong, said recess being substantially centered about said axis, said controller being movably mounted in said housing for causing said unlocking of said spool through movement of said annular recess substantially parallel to said axis, said controller including a sleeve which is substantially centered about said axis, and
a guide for said sleeve, said sleeve being slideably mounted about said guide for said movement substantially parallel to said axis.

7. A housing and dispensing assembly for a cutting line member of a cutting apparatus, comprising:
a housing rotatable about an axis;
a spool mounted within said housing for winding the line member therearound and for extending the line member therefrom exteriorly of said housing to contact and cut vegetation by rapid circular movement exteriorly of said housing during rotation of said housing; and
means connected to said housing for locking said spool against rotation of said spool relative to said housing and for unlocking said spool during rotation of said housing to permit said relative rotation and unwinding of the line member from said spool, said locking and unlocking means including,
a locking and unlocking controller having a bearing surface defining an annular recess therealong, said recess being substantially centered about said axis, said controller being movably mounted in said housing for causing said unlocking of said spool through a substantially upward movement of said annular recess with respect to said housing, said controller including a sleeve which is substantially centered about said axis, and
a guide for said sleeve, said sleeve being slideably mounted about said guide for said substantially upward movement.

8. A housing and dispensing assembly for a cutting line member of a cutting apparatus, comprising:
a housing rotatable about an axis;
a spool mounted within said housing for winding the line member therearound and for extending the line member therefrom exteriorly of said housing to contact and cut vegetation by rapid circular movement exteriorly of said housing during rotation of said housing; and
means connected to said housing for locking said spool against rotation of said spool relative to said housing and for unlocking said spool during rotation of said housing to permit said relative rotation and unwinding of the line member from said spool, said locking and unlocking means including a locking and unlocking sleeve having a bearing surface defining an annular recess therealong, said recess being substantially centered about said axis, said sleeve being movably mounted in said housing for causing said unlocking of said spool through movement of said annular recess substantially parallel to said axis.

9. A housing and dispensing assembly as defined in claim 8 wherein said locking and unlocking means further includes a core member, said sleeve being slideably mounted about said core member for said movement substantially parallel to said axis.

10. A housing and dispensing assembly for a cutting line member of a cutting apparatus, comprising:
a housing rotatable about an axis;
a spool mounted within said housing for winding the line member therearound and for extending the line member therefrom exteriorly of said housing to contact and cut vegetation by rapid circular movement exteriorly of said housing during rotation of said housing; and
means connected to said housing for locking said spool against rotation of said spool relative to said housing and for unlocking said spool during rotation of said housing to permit said relative rotation and unwinding of the line member from said spool, said locking and unlocking means including a locking and unlocking sleeve having a bearing surface defining an annular recess therealong, said recess being substantially centered about said axis, said sleeve being movably mounted in said housing for causing said unlocking of said spool through a substantially upward movement of said annular recess with respect to said housing.

11. A housing and dispensing assembly as defined in claim 10 wherein said locking and unlocking means further includes a core member, said sleeve being slideably mounted about said core member for said substantially upward movement.

* * * * *